United States Patent [19]

Gabrielyan

[11] Patent Number: 4,832,476
[45] Date of Patent: May 23, 1989

[54] BLIND SPOT VIEWING MIRROR SYSTEM

[76] Inventor: Mher Gabrielyan, 5726 Cleon St., North Hollywood, Calif. 91601

[21] Appl. No.: 101,786

[22] Filed: Sep. 28, 1987

[51] Int. Cl.[4] .......................... B60R 1/04; B60R 1/08; G02B 7/18
[52] U.S. Cl. ................................. 350/626; 248/900; 248/479
[58] Field of Search ............... 350/626, 625, 632, 606, 350/604, 635, 640; 248/900, 549, 475.1–487

[56] References Cited

U.S. PATENT DOCUMENTS

| 3,048,084 | 8/1962 | Iannvzzi | 350/626 |
| 3,954,328 | 5/1976 | Ames | 350/626 |

FOREIGN PATENT DOCUMENTS

| 565546 | 3/1958 | France | 248/475 R |
| 1416590 | 9/1965 | France | 350/626 |
| 223354 | 1/1973 | France | 350/626 |
| 2256851 | 8/1975 | France | 350/626 |
| 2472493 | 7/1981 | France | 350/626 |
| 70746 | 5/1982 | Japan | 248/549 |

Primary Examiner—Jon W. Henry
Attorney, Agent, or Firm—Frank L. Zugelter

[57] ABSTRACT

A Blind Spot Rear-View Mirror Assembly System whereby the blind spot to either rearside of the driven vehicle can be observed by the operator. Such system comprises a secondary mirror assembly swivally mounted to the primary or interiorly mounted rear-view mirror assembly in the vehicle. The system includes a base member mounted to the backwall of the primary assembly, and on which a pivot mechanism is mounted, a rod-and-ball arrangement pivotally mounted to such mechanism, with the ball being universally swiveable in a socket in the secondary mirror assembly. A retainer is mounted on the base member to retain the rod in its adjustable length-wise position to the primary assembly with such retention also preventing the primary assembly from freely pivoting about the pivot mechanism, the rod becoming automatically free of the retainer in the event the body of operator or passenger strikes the secondary assembly in a jarring collesion.

6 Claims, 1 Drawing Sheet

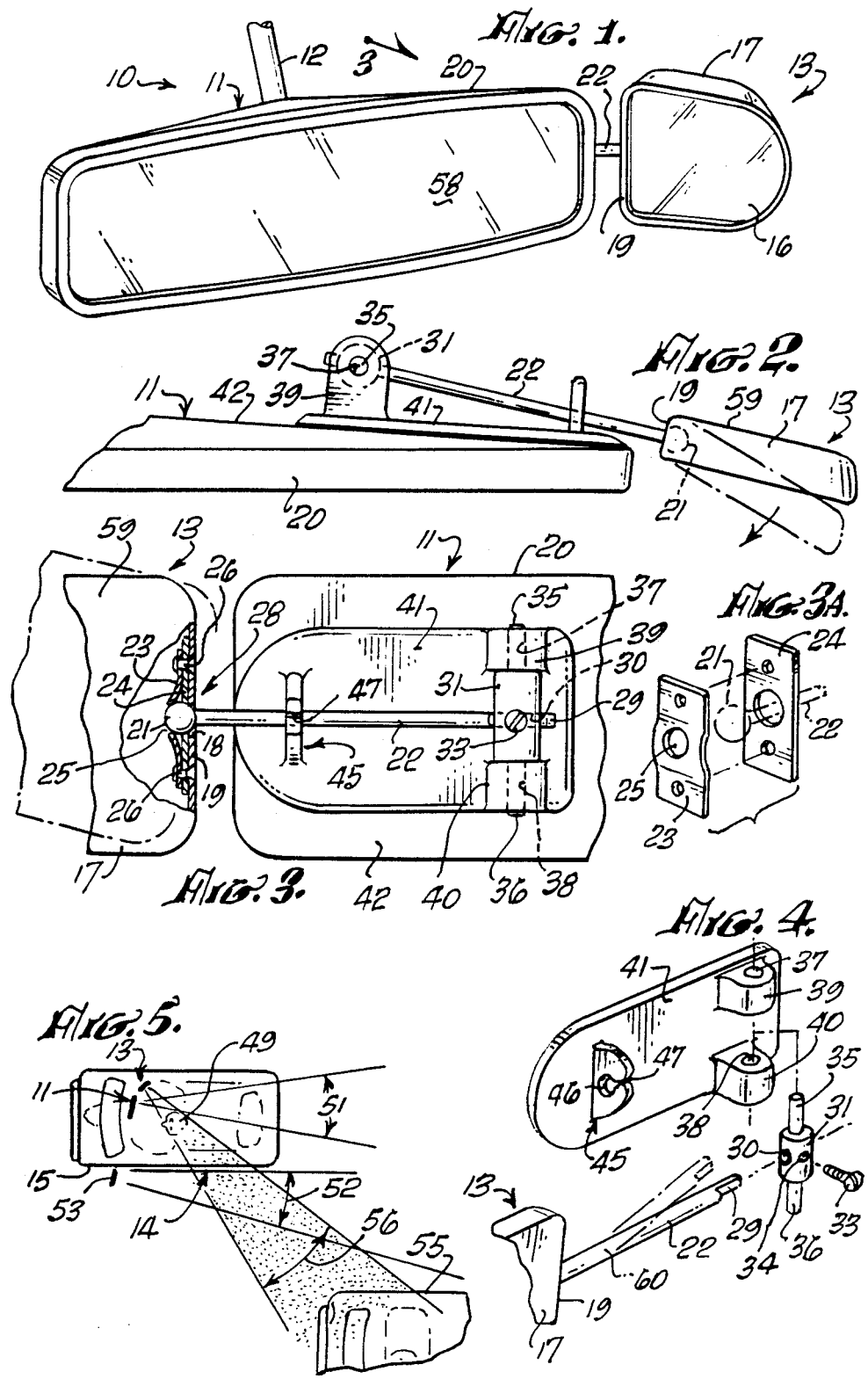

BLIND SPOT VIEWING MIRROR SYSTEM

TECHNICAL FIELD

This invention is directed to rear-view mirror systems or assemblies for road vehicles, and is particularly related to a secondary rear view assembly, with or not with a vehicle's standard interior rear-view mirror, by which a vehicle operator can view a blind spot to the left or right rear of the operated vehicle.

BACKGROUND ART

Various rear view mirror assemblies for vehicles are disclosed in the following U.S. Pat. Nos.: 1,401,942; 1,544,244; 4,331,382; and 4,664,489.

DISCLOSURE OF THE INVENTION

This invention is concerned with a system of rear view mirrors by which a blind spot, generally associated with the left or right rear of the operator's vehicle, cannot be optically viewed by the vehicle's operator by reason of limitations of standard exteriorly-mounted and interiorly-mounted rear view mirrors which provide optical viewing to the left or right rear of the operator's driving position in the vehicle. The interior rear-view mirror is mounted midway the width of the vehicle's cab, immediately adjacent the vehicle's windshield, and in many, most or all instances an assisting rear-view mirror is mounted exteriorly of the vehicle, usually from the operator's or driver's door panel or from a fender area immediately adjacent the driver's door panel. However, neither provide for an optical field of vision to the corresponding left or right rear of the moving vehicle in an area or space described as a "blind spot". This blind spot is particularly dangerous in today's high speed traffic conditions, as the driver does not know if another vehicle is or is not in the blind spot when he desires to initiate a proper vehicle-moving procedure. Such danger is exemplified by smaller vehicles on the road today. These smaller vehicles do not show up in either the rear-view or side door mirrors to assist the operator in driving the vehicle. And such danger is not limited to such smaller vehicles, as the size of the vehicle to the left or right rear does not eliminate the blind spot. The disclosure in U.S. Pat. No. 4,331,382 presents one solution to the same general problem, however, the disadvantages there are that the operator of the vehicle must turn his head back and forth to view different fields of vision, first, from the interior rear-view mirror midway his windshield to, second, the door panel mirror; and that the optical vision is distorted by the nature of such disclosure, thus not perceiving a correct position of a car in the blind spot. In this invention, the operator's eyes, without movement of his head, are able to rapidly or instantly change from his primary rear-view mirror assembly to the immediately adjacent secondary rear-view mirror assembly, to provide the operator immediate access to the blind spot and with a correct geometrical or visual perspective.

In more particularity, the invention comprises an interiorly mounted rear-view mirror assembly universally or swivebly mounted to a conventional or standard rear-view mirror assembly interiorly mounted midway the width of a vehicle's cab. A support or base for the secondary assembly is securely mounted on the back wall of the primary assembly, and comprises an attachable member, such as for example rubber material bondable or curable to metal or plastic materials, having a pivot mechanism mounted thereon adjacent its one or distal end and a retainer adjacent its other or proximate end (adjacent the primary assembly) to maintain the secondary assembly in its swiveled position. From the pivot mechanism, an adjustable rod extends laterally, substantially across one-half the width of the base, to a swivel member universally mounted in a socket along the one wall of the secondary assembly's housing, and is retained in the retainer as well in order to maintain the secondary assembly in its swiveled position. Such retention also prevents free pivoting of the system about the pivot mechanism. On the other hand, the retainer provides for release of the secondary assembly were the body or person in the vehicle to hit such assembly, say, in a collision, thereby preventing serious injury that would occur were such assembly not to give way to the force of the body or person.

An object of this invention is to provide a novel and distinct mirror accessory for optically viewing the blind spot to the left and/or right rear of a vehicle.

Another object of this invention is to provide an inexpensive mirror accessory that can be mounted easily and conveniently to a standard interiorly-mounted rear-view mirror assembly which remains in operative status.

A further object of this invention is to provide elimination of danger and harm to one's person or body when the invention is installed in a vehicle which is subsequently involved in a collision.

These and other features and advantages will become apparent upon a full and complete reading of the following description, the appended claims thereto, and the accompanying drawing comprising one (1) sheet of six (6) FIGURES.

BRIEF DESCRIPTION OF THE DRAWING

FIG. 1 is a perspective view of an embodiment of the invention.

FIG. 2 is a fragmentary plan view of FIG. 1.

FIG. 3 is a fragmentary elevational view, from a vehicle's windshield position, of the embodiment shown in FIGS. 1 and 2.

FIG. 3A is an exploded fragmentary perspective view of a portion of FIG. 3.

FIG. 4 is an exploded perspective view of the subject matter of the invention.

FIG. 5 is a schematic plan view of the invention in its employment by which the blind spot is accessed.

BEST MODE FOR CARRYING OUT THE INVENTION

Referring now to the drawing wherein reference characters correspond to like numerals hereinafter, 10 identifies the environment or context in which the invention is utilized. The context 10 shown in FIG. 1 illustrates a primary or conventional positionally-adjustable rear-view mirror assembly 11 suitably mounted upon a shaft 12 that is supported by the glass of the vehicle's windshield (not shown), or otherwise supported elsewhere within the cab of the vehicle, such as usually up above and to the interior housing for the vehicle's cab (not shown). To the right side of the primary assembly 11, a secondary rear view mirror assembly 13 is disposed, for positional adjustability by an operator sitting in the driver's seat of the vehicle. The effect of such adjustability provides access to the eyes of the driver of the blind spot 14, FIG. 5, to the left rear of the vehicle 15. Secondary assembly 13 includes a mirror facing 16 incorporated within its housing 17, all of which is fabricated with known materials by conventional processes. A hole 18, FIG. 3, is included within a sidewall or flange 19 of housing 17, wall 19 being proximate or adjacent to a housing 20 for primary assembly 11, to receive a swivel or ball 21 formed on or otherwise suitably secured at the end of a rod 22. One of a pair of spring metal members 23, 24 having a hole 25 functions as a seat for ball 21 while the other apertured metal member 24 retains ball 21 within hole 18, FIG. 3A, both members 23, 24 being riveted as at 26 to wall 19 of the housing 17. Thus a swiveling socket 28, FIG. 3, for the secondary assembly 13 is effectively generated at the one end of rod 22. At the other end of rod 22, a recess or flat 29 is formed. Flat 29 is secured in a bore 30 diametrically disposed in a cylindrical metal pivot plug 31 by means of a set screw 33 threaded to its cooperating threaded bore 34, FIG. 4, in pivot member 31. Plug 31 includes a pair of fingers 35, 36, extending from it in opposing fashion and along its longitudinal axis, to be received within corresponding bores 37, 38 of a pair of spaced lugs or projections 39, 40 integrally formed on a base or support 41. The secondary assembly 13 is adjustable in its spaced relationship to primary assembly 11 by adjusting the position of flat 29 relative to set screw 33.

Base 41 is made from a rubber or other bendable material in order to slip pivot fingers 35, 36 into their corresponding bores in lugs 39, 40 and is secured by suitable bonding glue or the like to the backwall 42 of housing 20 for primary assembly 11. Base 41 includes, FIG. 3, a retainer 45 mounted in spaced relationship to and disposed between the plane for lugs 39, 40 and socket 28, and which includes an off-set aperture 46, FIG. 4, into which rod 22 is introduced through an entry channel 47. Retainer 45 extends preferably upright from base 41 while aperture 46 is off-set to entry channel 47 in order to maintain assembly 13 in its swivelled position and to prevent such assembly from freely swinging about the pivotal axis of the pivot mechanism or plug 31 during operation of the invention. Further, in case of a jarring collision for the vehicle, rod 22 can become free automatically of aperture 46, thus providing freedom of movement for secondary assembly 13 about its pivot mechanism, rather than it being an irremovable object vis-a-vis the body or person of the vehicle's driver or passenger should such body or person hit assembly 13.

It may be noted that base 41 is of a size which mounts within generally one-half of the areal dimension of backwall 42 of assembly housing 20. The important criteria for the size of base 41 is that it is strong enough to support the pivot mechanism, rod 22, retainer 45 and secondary assembly 13 while also providing a sufficient length between the pivot mechanism and retainer 45 by which the weight of rod 22 and assembly 13 can be more evenly distributed across base 41 and housing 20.

In operation, as an operator 49 sits in the driver's seat of the cab of the vehicle 15, FIG. 5, he presently has available, in conventional contemplation, a field of vision 51 accessed through the primary rear-view assembly 11, and a field of vision 52 accessed through another conventional rear-view assembly 53 exteriorly mounted on or adjacent to the door panel of the vehicle 15. It will be observed from FIG. 5 that neither of these fields of vision 51, 52 provide access to a vehicle 55 located within the blind spot 14 that lies within the field of vision 56 illustrated in FIG. 5. Thus, after the operator 49 is seated and is driving along the roadway, he first adjusts the position of mirror 58 in assembly 11 to his optical satisfaction relative to field of vision 51, in the usual manner of such an adjustment. Likewise, as to exteriorly mounted assembly 53 as it applies to the field of vision 52. Then he adjusts the mirror 16 of the secondary assembly 13 in such a manner as to gain access to blind spot 14 within the field of vision 56. The driver does this by keeping rod 22 within aperture 46 of its retainer 45, while swiveling the entire assembly 13 about the socket 28 formed about ball 21 in housing 17. It may be noted that the phantom lines outlining housing 17 in FIGS. 2 and 3 depict or illustrate a universal (three-dimensional) swiveling of housing 17 and its mirror 16. Once final swiveling adjustment has been accomplished, the head of the operator need not be turned to any degree. Rather, as his head remains in a frontward orientation, he turns merely his eyes (or uses the acuity of his eyes without moving them in their sockets) in a substantially smaller angle, to mirror 16 of the secondary assembly 13 in order to observe a vehicle 55 or not in his blind spot 14 in the field of vision 56. Thus, he is able to see the on-going direction of his own vehicle 15 as he should, while also being readily prepared to operate his vehicle 15 relative to vehicle 55, than rather being exposed to a tenative or proposed moving procedure requiring turning of both head and eyes to observe whether there is or is not a vehicle 55 in his blind spot 14 to the left rear of his vehicle 15, such being a dangerous or serious procedure.

In assembly, base 41 is bonded, glued or otherwise suitably secured to the backwall 42 of housing 20. However, base 41 is first pliably bent or turned sufficiently to introduce fingers 35, 36 of plug 31 into their corresponding bores 37, 38, of lugs 39, 40. Once support 41 and plug 31 are mounted to backwall 42, flat 29 is introduced into bore 30 to mate with set screw 33 which positionally secures rod 22. Previously, apertured metal plate 24 mounted on rod 22 is introduced into housing 17 onto positional rivets 26, the length of rod 22 being thrust through hole 18. Thereafter, hole 25 of metal plate 23 is mounted upon ball 21 and rivets 26 compressed to retain the metal members 23, 24 and ball 21 in the generated socket formation 28. Mirror 16 then can be assembled to its housing 17. Rod 22 then can be swung into its retained position, afforded by retainer 45. Alternatively, swivel rod 22 is assembled first to housing 13, and base 41 with its pivot mechanism to housing 11, after which rod 22 is mounted to plug 31.

The elements described above are fabricated by known processes upon known or suitable materials utilized in the manufacture of rear-view mirrors, accessories and the like.

Various changes and modifications now become apparent, though not limited to the following. The invention can be mounted to other than the primary assembly 11, such as from the interior top of the vehicle's cab. A crook 60, FIG. 4, may be introduced into rod 22. Should base 41 be firm, i.e., not sufficiently bendable to introduce fingers 35, 36 into their corresponding lugs 39, 40, plug 31 and the fingers 35, 36 may be made in separate pieces, the latter two mounting into a bore or bores provided in plug 31. Further, the invention is applicable or mountable to the left side as well as to the illustrated right side of the primary assembly 11 of this disclosure. Also, the wall 19 in assembly 13 is not limited to a side or flange formed in housing 17, i.e., socket 28 can be mounted on another wall, such as backwall 59, FIG. 3, in housing 17 as well. Also, a socket arrangement can be state-of-the-art fashioned other than what has been disclosed and illustrated herein.

INDUSTRIAL APPLICABILITY

The invention is applied to the industries in which moving vehicles are found, including automobiles, trucks, and airplanes, motorcycles, water boats and military vehicles. However, the invention is not limited to such industries, and may be utilized elsewhere, wherever there is a need to view or observe behind one's self and in which context a blind spot exists.

I claim:

1. Support means which combines first and secondary mirror assemblies, the first of said assemblies having a housing and a wall, said support means in a universally swivable relationship with the second of said assemblies, and comprising
    a base mountable on the wall of the first of said assemblies,
    pivot means having an axis and being mounted on said base and comprising
        a pair of spaced lugs and a rotatable member mounted to and between said lugs, and
    connecting-together means comprising
        a rod-and-ball arrangement, the rod being mounted to said rotatable member while said secondary of said assemblies is swivably mounted to the ball, and
    means for retaining said connecting-together means mounted on said base.

2. The support means of claim 1 wherein the rod is adjustably mounted to said rotatable member.

3. The support means of claim 1 or claim 2 wherein said retaining means comprises
    a tab having an aperture and an entry channel for said rod.

4. The support means of claim 3 wherein said aperture is offset to its entry channel.

5. The support means of claim 3 wherein said tab is upright from said base.

6. The support means of claim 4 wherein said tab is upright from said base.

* * * * *